United States Patent

Lesh

[15] 3,701,428

[45] Oct. 31, 1972

[54] SEWAGE DISPOSAL SYSTEMS

[72] Inventor: Ed Lesh, 1337 Woods Run, Pittsburgh, Pa. 15212

[22] Filed: July 17, 1970

[21] Appl. No.: 55,644

Related U.S. Application Data

[63] Continuation-in-part of Ser. No. 662,255, July 28, 1967, abandoned.

[52] U.S. Cl. ................................................210/170
[51] Int. Cl. .............................................E02b 15/04
[58] Field of Search....210/242, 170, 523 S, DIG. 21; 61/.5, 11, 13

[56] References Cited

UNITED STATES PATENTS

| 346,203 | 7/1886 | Hinsdale | 210/242 X |
| 3,113,699 | 5/1961 | Clawford et al. | 61/.5 |
| 3,191,386 | 6/1965 | Wiegel et al. | 61/.5 |
| 3,221,884 | 12/1965 | Muller | 210/DIG. 21 |

*Primary Examiner*—Reuben Friedman
*Assistant Examiner*—T. A. Granger
*Attorney*—Buell, Blenko & Ziesenheim

[57] ABSTRACT

A sewage disposal unit is provided comprising a plurality of flexible sewer pipes adapted to be connected at one end to the mains of a sewage disposal system, a flexible plastic septic tank submerged in a body of water adjacent the said sewage mains and connections between the other ends of said flexible sewer pipes whereby the said mains are connected for discharge through the plastic pipes into the flexible plastic septic tank, said tank being supported and protected by the surrounding water in which it is submerged.

7 Claims, 9 Drawing Figures

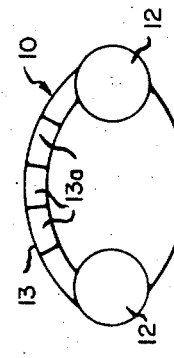
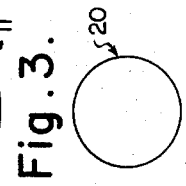
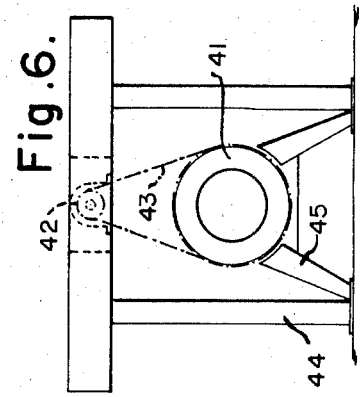
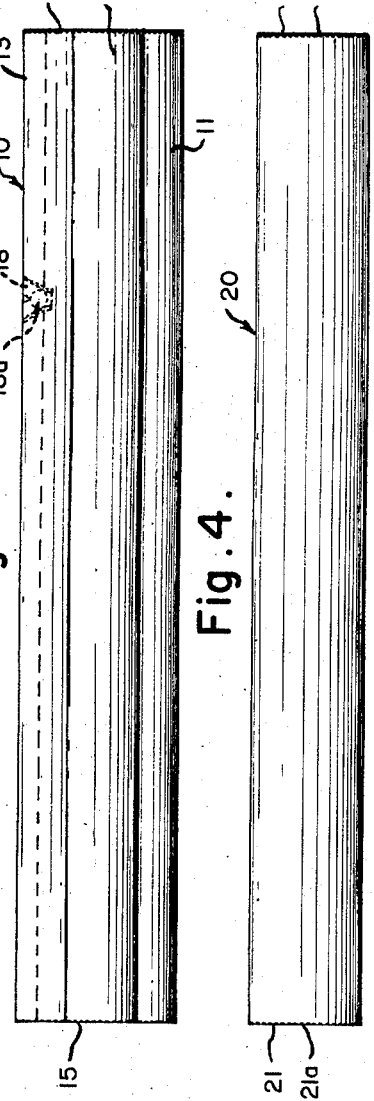
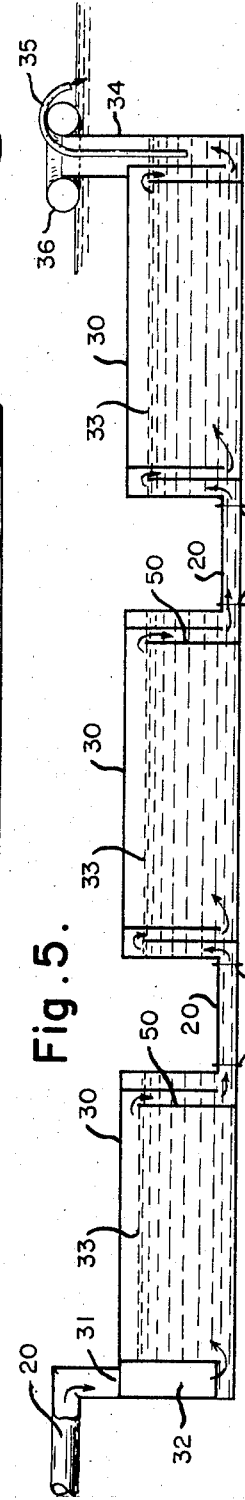
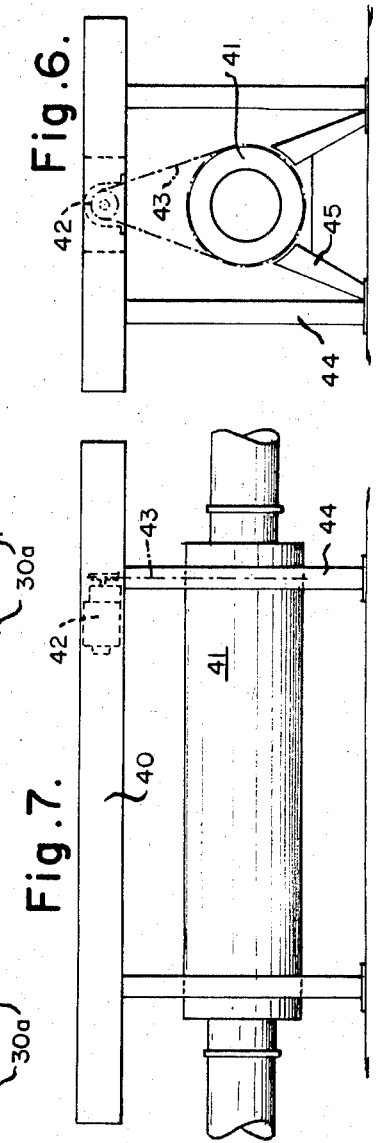

SEWAGE DISPOSAL SYSTEMS

This application is a continuation-in-part of my copending application, Ser. No. 662,255 filed July 28, 1967 now abandoned.

This invention relates to sewage disposal systems and particularly to a collapsable, transportable sewage system adapted to supplement already existing systems, to provide an emergency system and to be used in areas where sewage disposal and pollution have become a problem.

This invention is directed to a sewage disposal system submerged in a body of water such as one of the Great Lakes or any similar body of water. The problems of sewage disposal are so well known as to require no detailed explanation. There are various sewage disposal systems now used in this country. The two most prevalent systems are those based upon consumption of the sewage by oxygen activated bacteria. Such systems require large aerating tanks and compressor system to furnish the necessary air for bubbling in the tanks. The other system is based upon the so-called "septic tank" system which similarly relies upon the action of bacteria. Such systems are generally placed underground and the effluent dissipated through an underground drain field. In both cases the structures require extensive excavation, concrete reinforced tanks and structures and the expenditure of vast sums of money and the use of substantial areas of expensive and useful land.

I have developed a system which eliminates the need for extensive excavation and for the building of extensive and expensive tanks and buildings. I provide a system which takes advantage of the natural drainage of a water shed and of the cover of and support provided by a body of water. In my system the usual sewerage lines are brought to the edge of a body of water and there connected to flexible plastic pipe which are in turn connected to a flexible plastic septic tank system and/or filter tank system as required. The water, in which the plastic system is submerged, provides the necessary support for the septic tanks and plastic pipes without requiring extensive excavation and building of concrete tanks and the like. The pressure of a body of water thus protects the tanks against rupture from the internal sewage load by supporting the plastic walls with an opposite pressure.

The area of water in which this system is placed can be protected against the effects of wave motion by the use of a floating harbor over and surrounding the area above the septic system.

The system of my invention will be more fully understood from a consideration of the following description and the accompanying drawings describing the several elements making up my system.

FIG. 1 is a section through a floating sewer line according to this invention;

FIG. 2 is a side elevation of a sewer line as shown in FIG. 1;

FIG. 3 is a section through a non-floating sewer pipe according to this invention;

FIG. 4 is a side elevation of the non-floating sewer pipe of FIG. 3;

FIG. 5 is a sectional view through a submerged septic tank according to this invention;

FIG. 6 is a sectional view of a composting machine for use in my invention;

FIG. 7 is a side elevational view of a composting machine of FIG. 6;

Figure 8:
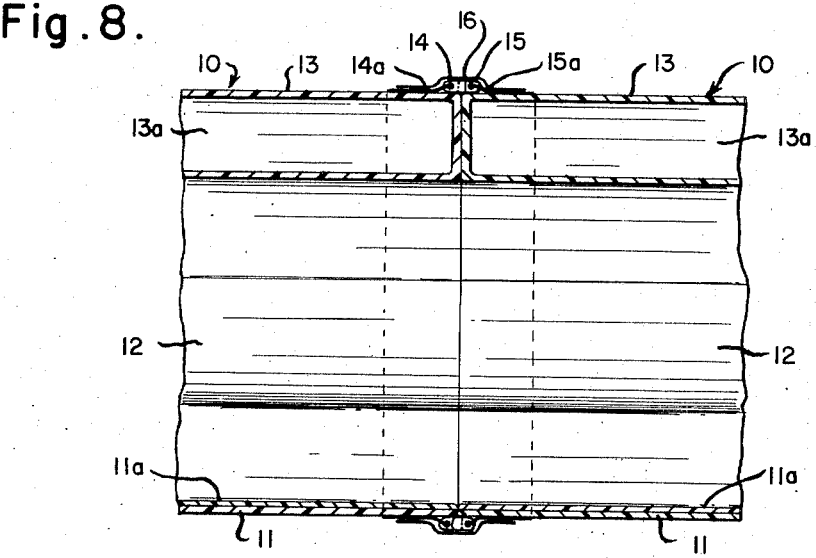
FIG. 8 is a section through the joint between connected lines according to this invention.

Referring to the drawings I have illustrated a floating sewer line segment 10 having a bottom sheet 11 of rubber or plastic, inflated side tubes 12 of rubber or plastic and an inflated canopy 13 made up of side by side elongated chambers 13a, all forming an elongated closed pipe by being brought together by hookless fasteners (zippers) 14 and 15 on a connecting flap 14a or 15a. The hookless fasteners (zippers) can be taped over 16 (FIG. 8) or the zipper may be a double zipper or hookless fastener 14c, 14d and 15c, 15d with an inflatable tube 17 therebetween forming a seal (FIG. 9). A pressure relief valve 18 may be used in the wall of the sewer line 10 to relieve excessive pressure. Such a valve might be a hollow ball 18a held in place by a cage over the relief opening and ballasted with water. The panels may be individually inflated or they may be inflated all at one time by means of connecting valves (not shown).

The bottom 11 is preferably made of Neoprene rubber with a fiber glass cloth inner surface 11a impregnated with Teflon or flexible epoxy resin.

Figure 9:
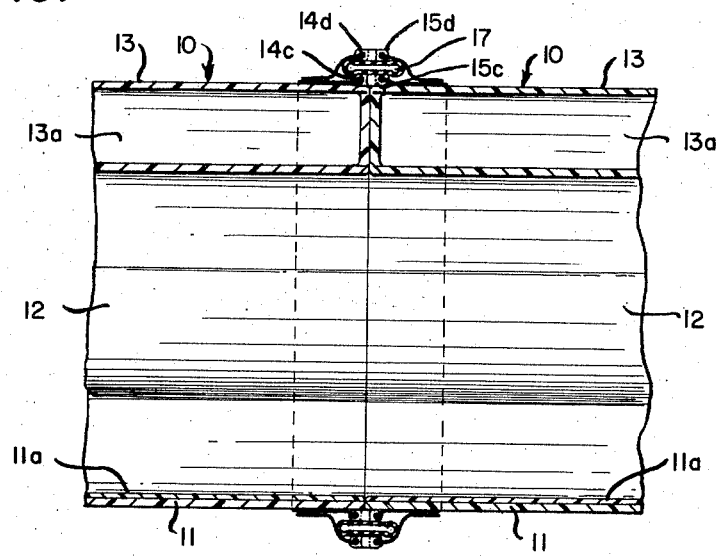
FIG. 9 is a section through a second embodiment of a joint.

The sewer pipe 20 shown in FIGS. 3 and 4 is a flexible round tube of rubber or plastic whose ends 21 can be fastened together by hookless fasteners 21a which are taped over or sealed by an inflatable tube between double zippers as in the floating sewer line (FIGS. 8 and 9).

The septic system is made up of separate inflatable tanks 30 of rubber or plastic which lay on the bottom of a body of water such as a lake or partially afloat as desired. The tanks 30 are fastened together by flexible pipes 20 fastened to ports 30a on the tank bottom by hookless fasteners as described above and shown in FIGS. 8 and 9. Sewage is introduced at entry opening 31 of the first tank from sewer line 20 through a grinder 32 operated by electrical, pressure, or similar switch.

The fluid level 33 in each tank 30 of the septic system changes until it overflows baffle 50 into the next compartment following the pattern shown by the arrows in FIG. 5. While everything shown in FIG. 5 is on a straight line, it will normally follow the contours of the bottom of the body of water using the naturally falling slopes of the lake as it moves toward its lower levels.

An exit tube 34 rises to the top of the last tank 30 in the system. A syphon system 35 is used to evacuate the tank. This can be started by a hand or other pump starting system. The syphon system and the upper end of tube 34 can be supported by a floating tube 36, positioned as needed.

An inflated float 40 is provided to support a composting turbilizer tank 41. A drive motor and gear train 42 is supported on float 40. The motor and gear train are such that a very low level of rotation is provided. The motor and gear train drive a belt drive 43 which drivingly engages a composting turbilizer tank which may be made of any suitable material such as fiber glass cloth impregnated with epoxy resin and/or Teflon. One might substitute boron fiber or the like. The tank 41 is provided with a stand 44 and brace 45. This composting tank can be moved ashore and replaced. It can be used on land as well as under water as shown. It can also be used as a portable composting machine by uniting one or more units on a Rollagon trailer truck, where it could deliver itself or be towed as desired. There would be no stand in such an installation, instead, a bed for the turbilizer tank with a hydraulic lift to lift end of tank while it would rotate and dump its contents into a spreader which would spread contents evenly over area designated. This arrangement would need portable jacks to accomplish same thing with the submerged type composting machine and a portable spreader at the rear as needed or desired.

An infra red heater, not illustrated, might be used to increase the activity of the system. In such a system a heater may be surrounded by an aluminum reflector encased with fiber glass and a watertight housing. The reflector is suspended in the housing and liquid silica-gel fills the area, this carries the heat and will not harm the aluminum reflector. The fiber glass housing projects down into the septic or filter system. This creates a warm humid atmosphere at all times during the year, to increase bacteria action, etc. There should also be fiber glass buoys floating on the surface with a drip adjustment leading into the septic tanks to introduce a material like Quick John, a bacteria generating compound, diluted in water. A gas release is preferably used at the high end of each tank. A pressure valve with a line leading to a gas tank floating over the system is provided allowing methane gas to be salvaged. This can be used as desired or needed. This system may be enclosed by a floating harbor which can have net curtains from tubes to bottom or where bottom is too deep, enclose bottom as well to the depth desired. All above systems can be suspended to depth as needed or desired with desired incline. A polypropylene net under part of the floating harbor protects fish from oil. A net grid floating on any oil can protect birds when needed or as desired. With addition of fertilizer to enclosed area an additional profit can be obtained. A fish farm both for releasing and for commercial market may thus be provided at the septic system.

While I have illustrated and described a presently preferred embodiment of my invention in the foregoing specification it will be understood that this invention may be otherwise embodied within the scope of the following claims.

I claim:

1. A sewage disposal unit for use in a location where the land supporting the unit may be covered by a body of water comprising a horizontally disposed flexible and elongated tank, inlet and outlet means located in opposite ends and adjacent the bottom of said tank, a plurality of spaced baffle means within said tank between said inlet and outlet means, pipe connection means between the end of a sewage line and the inlet means of said tank, said pipe means including flotation means whereby said pipes float on the surface of said body of water, and discharge means connected to said outlet means, said discharge means including flotation means whereby said discharge means float on the surface of said body of water.

2. A sewage disposal unit as claimed in claim 1 wherein the pipe means are floating, said pipes being made up of a pair of spaced apart inflatable tubes connected by a top cellular inflatable canopy and a spaced bottom sheet forming between said bottom sheet and inflatable canopy a passageway for sewage.

3. A sewage disposal unit as claimed in claim 1 wherein the pipe means are round flexible plastic tubes having mating hookless fastener members connecting one to another.

4. A sewage disposal unit as claimed in claim 3 wherein each of the mating hookless fastener members is surrounded by an inflatable tube, said tubes forming a gas tight seal around the fastener members.

5. A sewage disposal unit as claimed in claim 1 having grinder means for reducing the size of particles of sewage in the connection between the sewage pipes and the septic tank.

6. A sewage disposal unit as claimed in claim 1 having a solids composting means connected on the end of the tank remote from the connection to the sewage line and connected to the grinder means and means for diverting solids to said composting means from one of said connections.

7. A sewage disposal unit as claimed in claim 6 wherein the composting means includes a turbilizer tank, float means connected to said tank and drive means on the tank and float means rotating said tank.

* * * * *